United States Patent
Chang et al.

(10) Patent No.: US 7,210,835 B2
(45) Date of Patent: May 1, 2007

(54) DIFFUSION SHEET AND MANUFACTURING METHOD THEREOF

(75) Inventors: Jen Huai Chang, Yongjng Shiang (TW); Jyh-Horng Wang, Sansia Township, Changhua County (TW); Yu-Wei Chang, Jhongli (TW)

(73) Assignee: Entire Technology Co., Ltd., Taoyuan County (TW)

( * ) Notice: Subject to any disclaimer, the term of this patent is extended or adjusted under 35 U.S.C. 154(b) by 155 days.

(21) Appl. No.: 10/863,490

(22) Filed: Jun. 9, 2004

(65) Prior Publication Data
US 2005/0147830 A1    Jul. 7, 2005

(30) Foreign Application Priority Data
Jan. 2, 2004    (TW) .............................. 93100100 A

(51) Int. Cl.
*F21V 5/00* (2006.01)
(52) U.S. Cl. ...................... 362/558; 362/355; 362/330; 359/599; 349/64
(58) Field of Classification Search ............... 362/326, 362/606, 607, 617–619, 558–561, 330, 331, 362/333, 355; 349/64, 65; 428/323, 221; 264/614, 638; 359/599
See application file for complete search history.

(56) References Cited

U.S. PATENT DOCUMENTS

| | | | | |
|---|---|---|---|---|
| 4,053,208 A | * | 10/1977 | Kato et al. | 362/330 |
| 6,709,143 B2 | * | 3/2004 | Harada et al. | 362/558 |
| 6,871,994 B2 | * | 3/2005 | Harada et al. | 362/558 |
| 2002/0114169 A1 | * | 8/2002 | Harada et al. | 362/558 |
| 2002/0159003 A1 | * | 10/2002 | Sato et al. | 349/65 |
| 2003/0162860 A1 | * | 8/2003 | Ohno et al. | 522/173 |

* cited by examiner

*Primary Examiner*—Sandra O'Shea
*Assistant Examiner*—Bao Q Truong
(74) *Attorney, Agent, or Firm*—Rosenberg, Klein & Lee

(57) ABSTRACT

A diffusion sheet structure in the direct type backlight module with anti-UV rays function and its manufacturing method discloses a diffusion sheet in the backlight module applied to TFT-LCD TV, and plural layer of the diffusion sheet made by a method of a multi-layer co-extrusion. The diffusion sheet advocates that while producing diffusion layer, at least a ultra-violet rays absorption layer set on the surface of diffusion layer at the same time to achieve insulating ultra-violet rays directly irradiated on the diffusion sheet and to avoid yellow and pyrolysis phenomenon occurred on the diffusion sheet. These results in avoiding the deviation caused from color temperature and chromaticity coordinate of TFT-LCD TV because of yellow diffusion sheet, then to achieve the purpose of improving product quality and materials lifespan.

5 Claims, 4 Drawing Sheets

DIFFUSION SHEET AND MANUFACTURING METHOD THEREOF

BACKGROUND OF THE INVENTION

1. Field of the Invention

The present invention relates to a diffusion sheet structure in the direct type backlight module with anti-UV rays function and its manufacturing method, which especially points at a diffusion sheet in the backlight module applied to TFT-LCD TV. This invention explores a diffusion sheet with a ultra-violet rays absorption layer avoid yellow and pyrolysis phenomenon and finally to improve product quality and materials lifespan.

2. Description of the Prior Art

Since TFT-LCD has been invented, all kinds of colour monitor have been widely applied in the daily life, such as notebook, PC monitor, colour mobile phone, PDA, and LCD TV etc., which have accordingly replaced conventional display such as CRT, TN and STN. An example of TFT-LCD TV, TFT-LCD TV being accordingly accepted by the consumers is because of liquid crystal panel producing technology improvement, such as short response time, high resolution, and higher yield of large panel. Besides, higher brightness of backlight module is also one of the main factors.

The larger size of TFT-LCD TV requires more, the higher brightness of one requires more. Normally the brightness of TFT-LCD TV requires 800~1200 $Cd/m^2$, moreover, the uniform backlight module technology through light guide panel by the traditional edge light source can not satisfy the requirements of TFT-LCD TV. Therefore, high brightness of direct type backlight source is occurred.

In order to enhance the brightness of TFT-LCD TV, it is necessary to increase the quantity of CCFL (Cold Cathode Fluorescent Lamp) and the edge light source is changed into direct type light source, shown as FIG. 1, which is a schematic diagram of the prior art of direct type backlight module. As FIG. 1 shown, said direct type backlight module 1' comprises of a reflector 10', plural light source 20' and a diffusion sheet 30'. In order to avoid lamp mark, the light guide panel is required to be replaced by diffusion sheet to uniformly disperse the brightness of light source. The thickness of diffusion sheet is controlled in a range of 2 to 3 mm, the thickness of relative light guide panel is a range of 3 to 12 mm which having a large capability of reducing materials cost and to achieve the purpose of weight. The present diffusion sheet is mainly composed of PMMA (Polymethyl Methacrylate), MS (MMA/Styrene Copolymer), PC (Polycarbonate), and COC (Cycle Olefin Copolymer). and adding light diffusion particles in the transparent substrate to achieve uniform light.

The main strength of diffusion sheet in the composition of PMMA is well optical transmittance and yellow-resistance, however, the water absorption ratio of PMMA is in a range of 0.3 to 0.4% which resulted in a defect of warp and bad dimensional stability on the large TV. The light transmittance of MS and PC is small 2 to 3% than PMMA, but MS and PC has good performance on high temperature resistance and dimensional stability. The main defect is that MS and PC under irradiation of UV rays result in the problem of yellow. If the diffusion sheet in the composition of PC is long time irradiated under CCFL, then the problems of yellow will occur and result in colour temperature and chromatic aberration of panel. This problem is the main reason why diffusion sheet with PC materials cannot be extensively applied.

Therefore, providing a novel diffusion sheet structure in the direct type backlight module with anti-UV rays function and its manufacturing method for the aforesaid problems can not only improve the defects of yellow of the conventional diffusion sheet which resulted in deviation, but also can be simplified the process. Based on the inventor engaging on the research and develop and sales experiences for the related products for many years, the inventor finally proposes a method to improve the aforementioned problems for diffusion sheet structure in the direct type backlight module with anti-UV rays function and its manufacturing method, according to his professional background.

SUMMARY OF THE INVENTION

The primary purpose of the present invention is to provide a diffusion sheet structure in the direct type backlight module with anti-UV rays function and its manufacturing method, which using a ultra-violet rays absorption layer sets on a diffusion layer to achieve insulating ultra-violet rays directly irradiated on the diffusion and to avoid yellow and pyrolysis phenomenon occurred on the diffusion sheet. Furthermore, to avoid the deviation caused from color temperature and chromaticity coordinate of TFT-LCD TV because of yellow diffusion sheet, then to achieve the purpose of improving product quality and materials lifespan.

In order to perform the aforementioned purposes, efficiency and characteristics of each, the present invention explores that diffusion sheet structure in the direct type backlight module with anti-UV rays function and its manufacturing method, which is a diffusion sheet in the backlight module applied to TFT-LCD TV, and plural layer of the diffusion sheet made by a method of a multi-layer co-extruder. The present invention advocates that while producing diffusion sheet, at least a ultra-violet rays absorption layer set on the surface of diffusion sheet at the same time to achieve insulating ultra-violet rays directly irradiated on the diffusion sheet and to avoid yellow and pyrolysis phenomenon occurred on the diffusion sheet. These results in avoiding the deviation caused from color temperature and chromaticity coordinate of TFT-LCD TV because of yellow diffusion sheet, then to achieve the purpose of improving product quality and materials lifespan. For manufacturing technology, it is mainly using a co-extruder to produce multi-layer structure of diffusion sheet which is based on the diffusion sheet that a substrate adding a light diffusion materials, and in a range of 10 to 500 μm thickness of sheet is co-extruded at least on one side of diffusion sheet at the same time, then adding a transparent resin of UV rays absorbent to form at least one side of UV rays absorbent on said diffusion sheet, therefore, at least one side of anti-UV rays of diffusion sheet is formed.

DETAILED DESCRIPTION OF THE PREFERRED EMBODIMENTS

In order to clearly express and explore the feature characteristics and efficiency of the present invention for the committee of patent, the preferred embodiment and detailed description is as below.

In order to improve the yellow problems of the prior art which is resulted from UV rays for diffusion sheet of direct type backlight module that applied to TFT-LCD TV, the present invention proposes that setting a transparent substrate with a UV rays absorbent on the surface of diffusion sheet, the thickness of UV rays absorption can be controlled in a range of 1 to 200 μm. The present invention also proposes a process of co-extrusion While diffusion sheet is extruded by the main extruder, the sub-extruder extrudes UV rays absorption layer at the same time at least on one side of said diffusion sheet to achieve the effect of insulating UV rays directly irradiating on diffusion sheet to avoid yellow problem.

Figure 1:
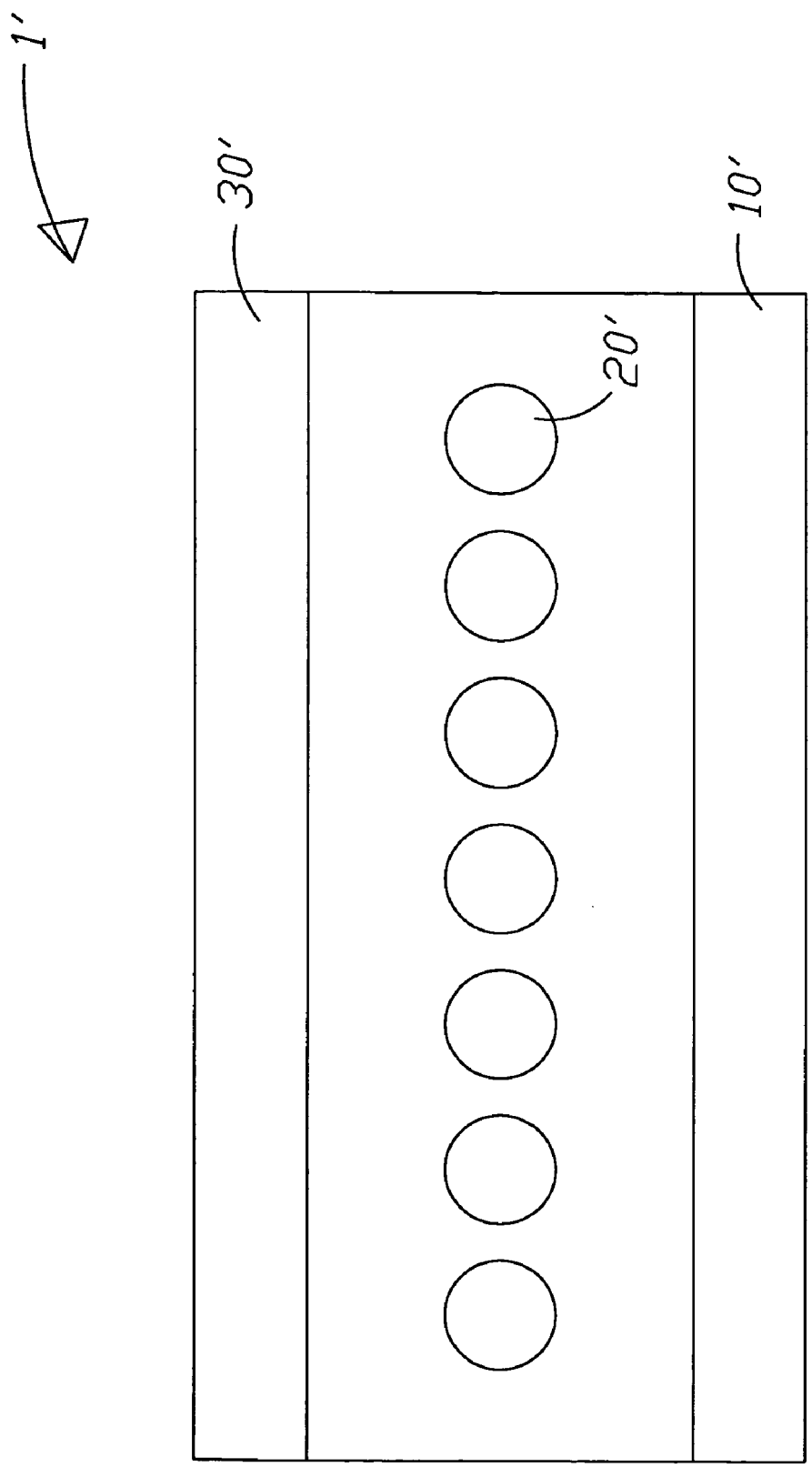
FIG. 1 is an illustrated diagram of the direct type backlight module of the prior art.
Figure 2:
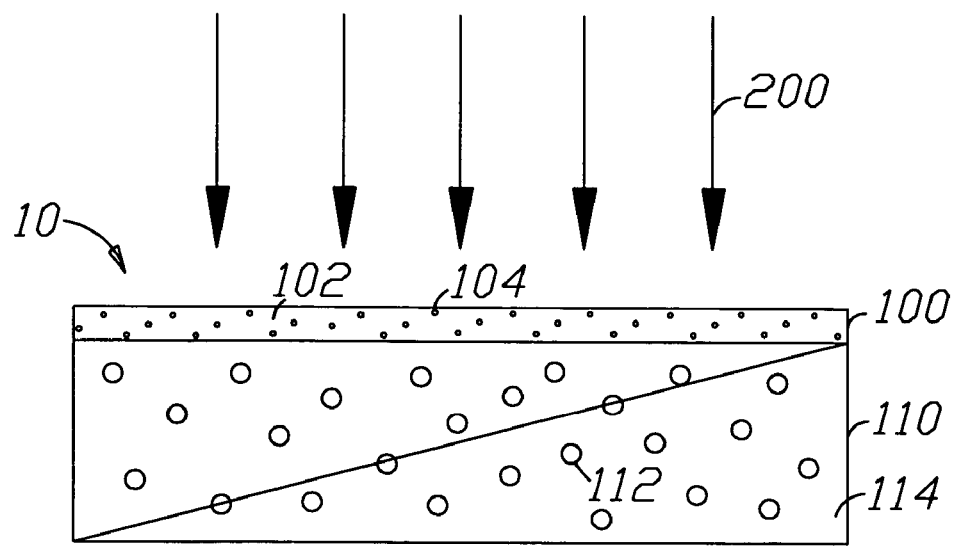
FIG. 2 is a schematic diagram of the preferred embodiment of the present invention.

FIG. 2 is a schematic diagram of the preferred embodiment of the present invention that explores diffusion sheet structure of the direct type backlight module applying to TFT-LCD TV. As shown in FIG. 2, the present invention explores a structure of diffusion sheet of the direct type backlight module with anti-UV rays function. Said diffusion sheet 10 comprises at least a UV rays absorption layer 100 and a diffusion sheet 110, wherein said UV rays absorption layer 100 is located at least one side of said diffusion sheet 110, wherein said UV rays absorption layer 100 is a UV rays 200 to insulate UV rays directly irradiating on said diffusion sheet 10 to avoid the problems of yellow and pyrolysis occurred on diffusion sheet.

Wherein said UV rays absorption layer 100 comprises a resin 102 which is selected from a transparent acrylic resin and a UV rays absorbent, the thickness of said UV rays absorption layer 100 is in a range of 10 to 200 μm. Said diffusion sheet 110 comprises pural light diffusion particles 112 which is selected from one of organic and inorganic materials, such as acrylic resin, Titanium Dioxide ($TiO_2$), Silicon Dioxide ($SiO_2$), and Silicon and its particle size is in a range of 1~50 μm. And a substrate 114 which is selected from one of acrylic resin, PMMA (Polymethyl Methacrylate), MS (MMA Styrene Copolymer), PC (Polycarbonate) and Cyclo Olefin Copolymer (COC).

Figure 2A:
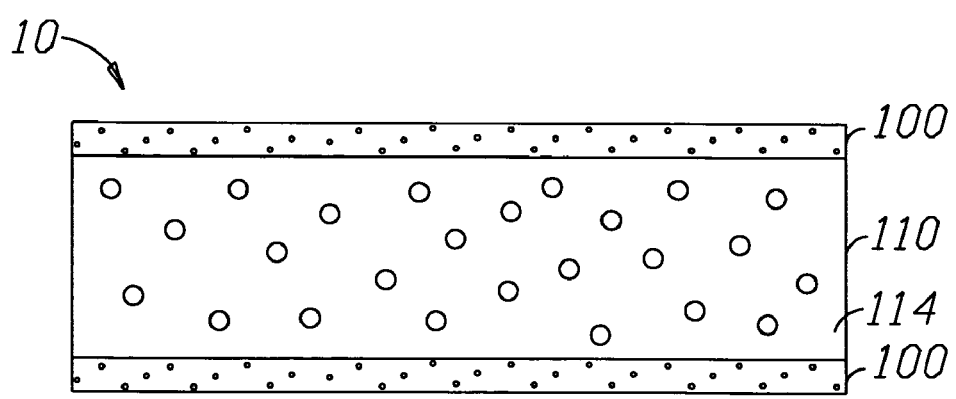
FIG. 2A is a schematic diagram of another preferred embodiment of the present invention.

Moreover, FIG. 2A is a schematic diagram of another preferred embodiment of the present invention that explores diffusion sheet structure. As shown in FIG. 2, the present invention explores that said diffusion sheet 10, wherein said UV rays absorption layer 110 can be located on the top and bottom of said diffusion sheet 120.

Figure 3:
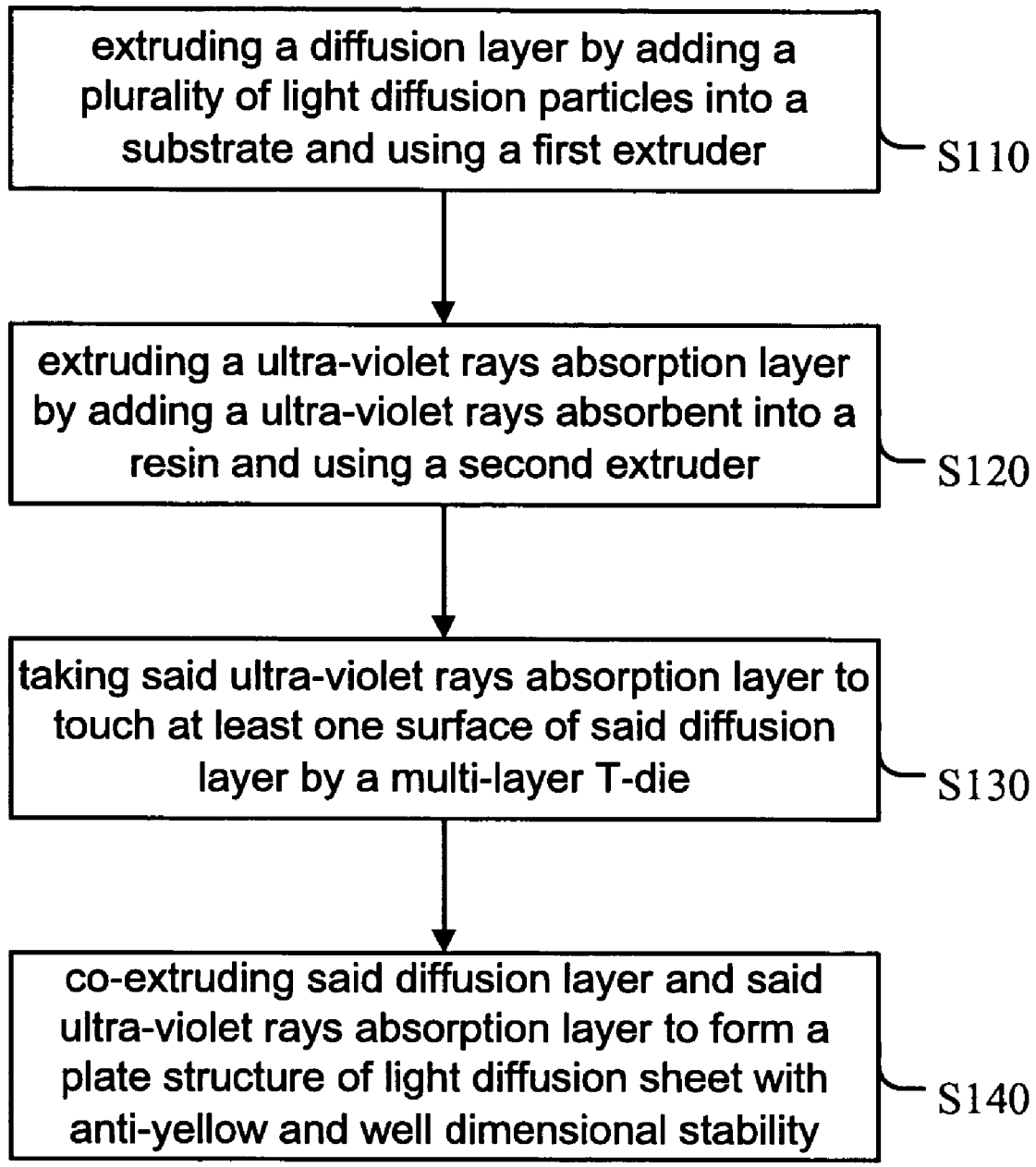
FIG. 3 is flowchart of the preferred embodiment of the present invention.

FIG. 3 is flowchart of the preferred embodiment of the present invention that explores a manufacturing process of diffusion sheet. As shown in FIG. 3, the present invention explores that a method of manufacturing diffusion sheet in the direct type backlight module with anti-UV rays comprising the steps of:

Step S110: extruding a diffusion layer by adding a plurality of light diffusion particles into a substrate and using a first extruder;

Step S120: extruding a ultra-violet rays absorption layer by adding a ultra-violet rays absorbent into a resin and using a second extruder;

Step S130: taking said ultra-violet rays absorption layer to touch at least one surface of said diffusion layer by a multi-layer T-die;

Step S140: co-extruding said diffusion layer and said ultra-violet rays absorption layer to form a plate structure of light diffusion sheet with anti-yellow and well dimensional stability.

Among step 110, the content of said light diffusion particles is 10 percent of said substrate. Among step 120, the increment of said UV rays absorbent is 1 to 5% of said resin.

Figure 4:
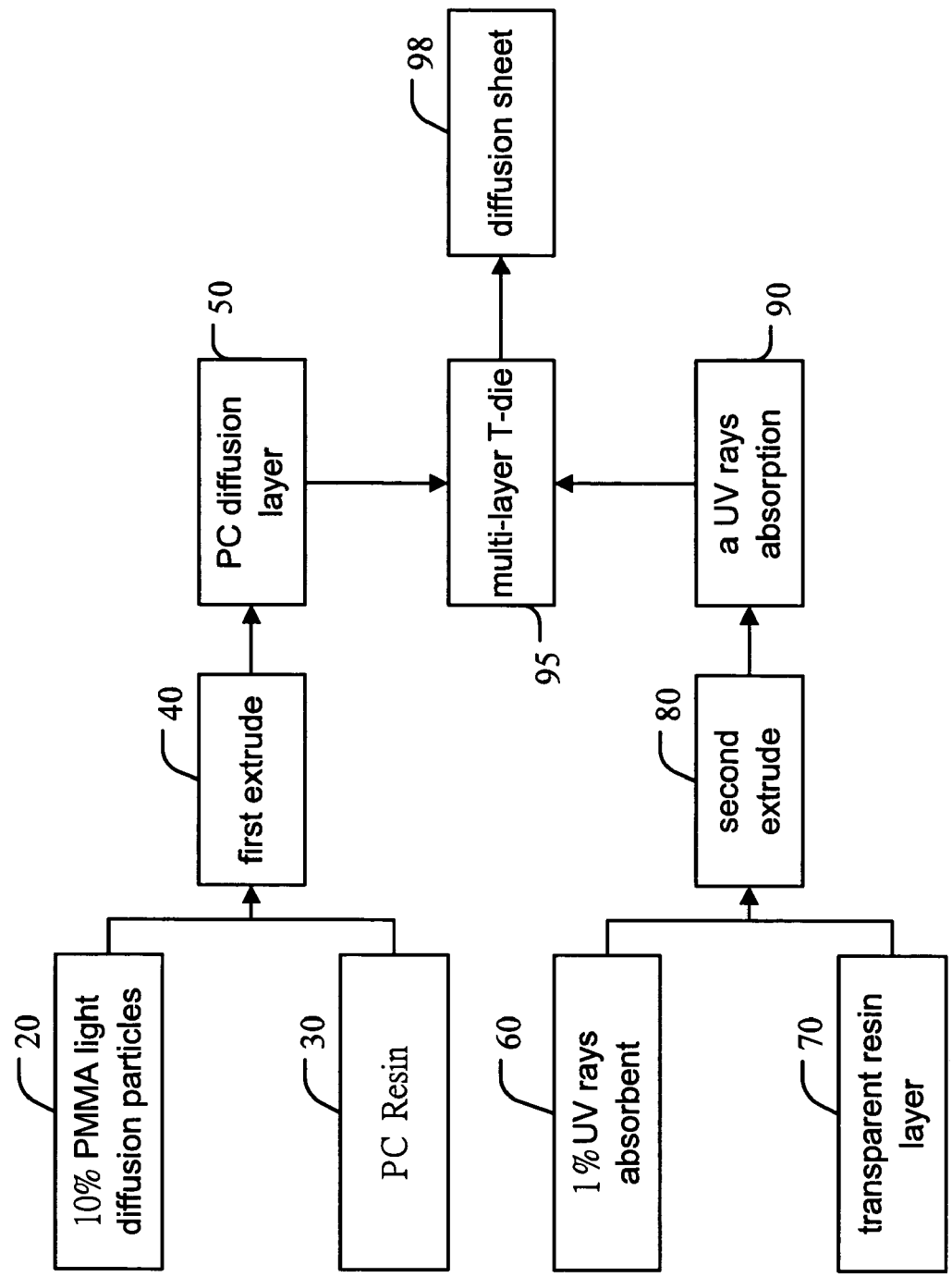
FIG. 4 is a graphic of the preferred embodiment of the present invention.

Finally, FIG. 4 is a graphic of the preferred embodiment of the present invention that explores diffusion sheet. As shown in FIG. 4, the present invention explores that steps of a diffusion sheet and its manufacturing method. Firstly, it is mainly using the first extruder 40 adding 10 percent of PMMA light diffusion particles 20 of PC resin 30 to extrude a diffusion sheet 50. Secondly, it is using the second extruder 80 adding 1 to 5% of UV rays absorbent 60 of transparent resin layer 70 to extrude a UV rays absorption layer 90. Thirdly, said UV rays absorption layer 90 is adhered on the top and bottom of diffusion layer 50 through multi-layer T-die 95. Finally, said PC diffusion layer 50 and at least a UV rays absorption layer 90 co-extrude a diffusion sheet 98 with plate structure of yellow-resistance and well dimensional stability.

Therefore, the present invention is related to a diffusion sheet and its manufacturing method which a diffusion sheet of backlight module applied to TFT-LCD TV that using a method of multi-layer co-extrusion molding technology produces plural layer diffusion sheet. The present invention is that while producing diffusion sheet of direct type backlight module of TFT-LCD TV, at least a ultra-violet rays absorption layer set on the surface of diffusion sheet at the same time to achieve insulating ultra-violet rays directly irradiated on the diffusion and to avoid yellow and pyrolysis phenomenon occurred on the diffusion sheet. These results in avoiding the deviation caused from color temperature and chromaticity coordinate of TFT-LCD TV because of yellow diffusion sheet, then to achieve the purpose of improving product quality and materials lifespan.

While certain preferred embodiments of the present invention have been disclosed in detail, it is to be understood that various modifications may be adopted without departing from the spirit of the invention or scope of the following claims.

What is claimed is:

1. A structure of a diffusion sheet in a direct type backlight module with ultraviolet ray resistance, comprising:
   a diffusion layer formed by light diffusing particulates disbursed in a first resin, said diffusion layer having first and second opposing sides;
   a first ultraviolet ray absorption layer overlaying said first side of said diffusion layer, said first ultraviolet ray absorption layer being formed by an ultraviolet ray absorbent disbursed in a second resin; and
   a second ultraviolet ray absorption layer overlaying said second side of said diffusion layer, said second ultraviolet ray absorption layer being formed by said ultraviolet ray absorbent disbursed in said second resin.

2. The structure of a diffusion sheet as claimed in claim 1, wherein said first and second resin are both transparent acrylic resin.

3. The structure of a diffusion sheet as claimed in claim 1, wherein said light diffusion particulates are formed by particulates of silicon.

4. The structure of a diffusion sheet as claimed in claim 1, wherein said light diffusion particulates are formed by particulates of titanium dioxide ($TiO_2$).

5. The structure of a diffusion sheet as claimed in claim 1, wherein said light diffusion particulates are formed by particulates of silicon dioxide ($SiO_2$).

* * * * *